United States Patent [19]

Bakke et al.

[11] 3,849,092

[45] Nov. 19, 1974

[54] APPARATUS FOR SEPARATING A GASEOUS CARRIER FROM PARTICULATE MATTER ENTRAINED THEREIN

[75] Inventors: Even Bakke, New Providence; Celestino G. Scapicchio, Newark, both of N.J.

[73] Assignee: The Slick Corporation, New York, N.Y.

[22] Filed: Mar. 31, 1972

[21] Appl. No.: 240,180

[52] U.S. Cl. .................... 55/302, 49/477, 55/341, 55/481, 55/502
[51] Int. Cl. ............................................ B01d 41/00
[58] Field of Search ....... 55/96, 302, 341, 288, 359, 55/373, 478, 374–377, 481, 502; 220/46 P; 49/477

[56] References Cited
UNITED STATES PATENTS

| | | | |
|---|---|---|---|
| 2,167,236 | 7/1939 | Gieseler | 55/341 X |
| 2,720,011 | 10/1955 | Krupp | 49/477 |
| 2,765,047 | 10/1956 | Hersey | 55/302 X |
| 2,805,731 | 9/1957 | Kron | 55/341 X |
| 3,178,779 | 4/1965 | Clark et al. | 220/46 P |
| 3,365,065 | 1/1968 | Varjabedian | 55/341 X |
| 3,486,310 | 12/1969 | Nilsson | 55/502 X |
| 3,680,285 | 8/1972 | Wellan et al. | 55/502 |
| 3,694,962 | 10/1972 | McDonald | 49/277 |

FOREIGN PATENTS OR APPLICATIONS

| | | | |
|---|---|---|---|
| 758,388 | 10/1956 | Great Britain | 49/477 |

*Primary Examiner*—Frank W. Lutter
*Assistant Examiner*—Vincent Gifford
*Attorney, Agent, or Firm*—Nims, Howes, Collison & Isner

[57] ABSTRACT

Dust collection apparatus for separating particulate matter from a gaseous carrier and adapted to permit facile and rapid inspection and change of permeable filter media therein. The dust collector includes a perimetric housing, a tube sheet having a plurality of permeable media filter socks mounted thereon and displaceable as a unit into the perimetric housing to there separate the clean and dirty air plenums and out of said housing for ready inspection and replacement of the filter media, inflatable sealing means disposed intermediate the periphery of the tube sheet and the perimetric housing limiting fluid communication from the dirty air to clean air plenums to passage through said filter media and associated means for rapidly inflating and deflating such sealing means.

3 Claims, 4 Drawing Figures

APPARATUS FOR SEPARATING A GASEOUS CARRIER FROM PARTICULATE MATTER ENTRAINED THEREIN

This invention relates to an improved construction for apparatus for separating particulate matter from gaseous carriers and more particularly to an improved construction for dust collectors to facilitate inspection and replacement of the permeable media components thereof.

In fabric type dust collectors, separation of solid particulate matter from a gaseous carrier is conventionally effected by selective passage of the gaseous carrier through elongate tubes or socks of permeable filter media. Effective operation of such dust collectors, and, more importantly the continued operation of the dust producing entities which such collectors conventionally serve, is dependent upon a continuity of proper functioning of the filter media since cessation of effective dust collector operation normally also necessitates a shutting down of the dust producing operating entity which the collector is serving. Such continuity of proper functioning of the filter media requires not only a desirably frequent inspection thereof but rapid replacement of any defective components thereof so as to minimize down time of the collector and the entities served thereby. The inspection and/or replacement of the elongate tubes or socks of permeable filter media in most conventional dust collectors usually requires physical entry within a perimetric housing and at least partial disassembly of the structural elements disposed therein. Apart from the difficulties attendant working with inaccessable and closely spaced elements, the entry into the housing is usually effected on the "dirty air" side of the tube sheet, a dust loaded and spacially restricted environment all of which makes the requisite inspection and repair operations unduly time consuming, generally unpleasant and oftentimes hazardous to health.

This invention may be briefly described as an improved removably mounting construction for permeable media supporting tube sheets in dust collector housings and which, in its broader aspects, includes the selective disposition of an inflatable sealing member disposed intermediate the perimetric housing of the collector and the periphery of the tube sheet for effecting a gas tight interconnection therebetween and thereby effectively separate the clean air and dirty air plenums to limit fluid communications therebetween to passage through the permeable mediums and means for positively and rapidly inflating and deflating such sealing member. In its narrower aspects the subject invention includes the incorporation of an inflatable peripheral seal for a removable tube sheet assembly and wherein the means for positively inflating and deflating the same from a portion of a pulse jet type of cleaning system for renewing the permeability of the filter media.

Among the advantages of the present invention is the permitted rapid removal and reinstallation of a permeable media bearing tube sheet assembly in dust collectors with an assured separation, during filtering operation of the clean and dirty air plenums save for fluid communication therebetween through the filter media. A more specific advantage of the subject invention is the provision of an improved gas tight seal assembly for removable tube sheet assemblies in dust collectors incorporating pulse jet cleaning techniques, that obviates the need for the presence of any movable mechanical elements in the dirty air plenum.

The principal object of the present invention is the provision of an improved sealing construction for removable media bearing tube sheet assemblies in dust collectors to facilitate inspection and replacement of filter media therein.

Another object of the invention is the provision of an improved sealing construction for removable filter media bearing tube sheet assemblies that dispenses with the need for movable mechanical elements in both the dirty and clean air plenums.

A further object of this invention is the provision of a simple and inexpensive means for effecting the positive inflation and deflation of an inflatable sealing element disposed intermediate the perimetric housing of a dust collector and a removable filter media bearing tube sheet assembly mounted therein.

A still further object of this invention is the provision of an improved gas tight seal construction for removable media bearing tube sheet assemblies in dust collectors incorporating pulse jet cleaning techniques that obviates the need for the presence of movable mechanical elements in the dirty air plenums.

Other objects and advantages of the present invention will become apparent from the following specification and from the appended drawings which illustrate, in accord with the mandate of the patent statues, the principles of the invention as embodied in a presently preferred embodiment thereof.

Referring to the drawings.

Figure 3:
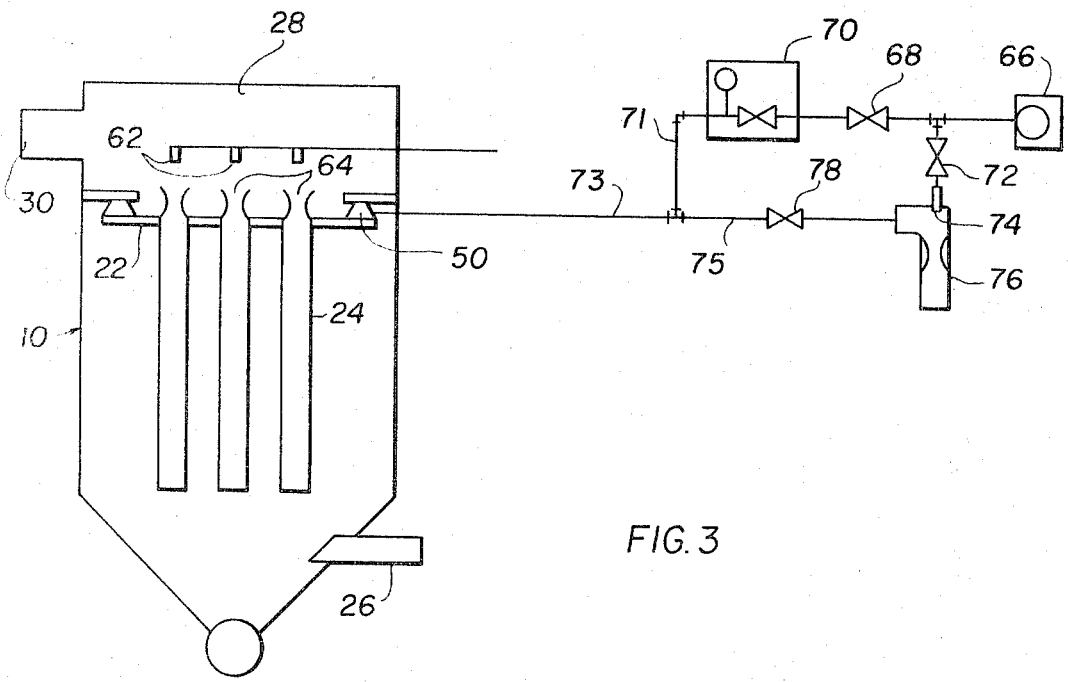
Figure 4:
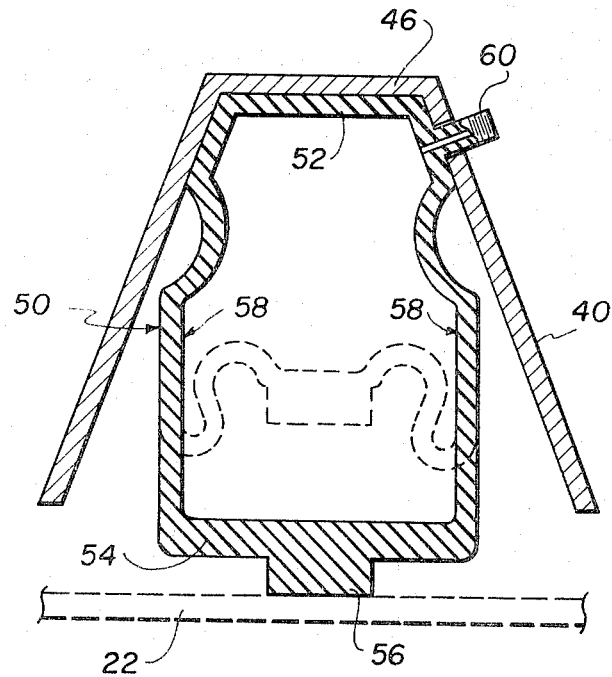

FIG. 3 is a schematic diagram of a pneumatic control circuit for effecting a positive inflation and deflation of the inflatable sealing element particularly adapted for use in collectors incorporating pulse jet cleaning techniques; and FIG. 4 is a enlarged schematic sectional view illustrating the configuration and positioning of the sealing means relative to the tube sheet when in inflated and deflated condition.

Figure 1:
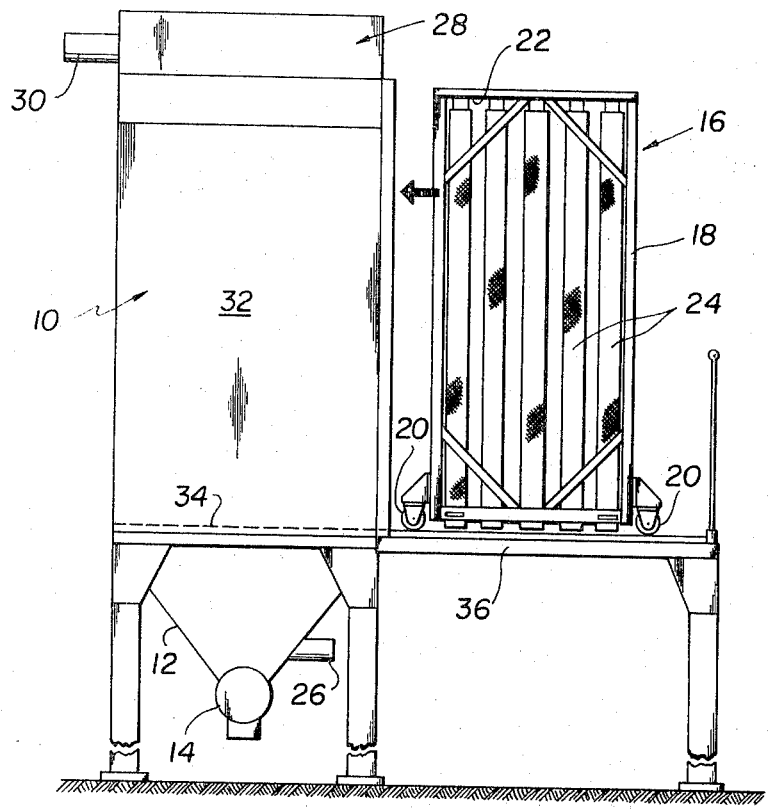
FIG. 1 is an illustrative side elevational view of a dust collector adapted to permit displacement of its tube sheet and associated permeable media filtering elements mounted thereon into and out of the perimetric collector housing.

Referring to the drawings and initially to FIG. 1, there is illustrated a dust collector having a generally rectangular perimetric housing dependently terminating in a conical hopper 12 from which collected particulates are periodically removed through an airlock type valve assembly 14. Adapted to be removably disposed within the housing 10 is a filtering assembly, generally designated 16, illustratively comprising a perimetric frame 18 mounted on rollers 20 and operatively including a tube sheet member 22 having a plurality of elongate filter socks or tubes 24 of permeable filter media dependently mounted thereon. The particulate bearing gas stream to be filtered may conveniently be introduced into the collector through entry conduit 26 and when the filtering assembly 16 is properly disposed within the housing 10, the gaseous carrier will flow upwardly, pass through the permeable filter media 24 and exit from the clean air plenum 28, disposed above the tube sheet 22, through a clean gas exit conduit 30. The enclosed portions of the system containing the particulate bearing gas stream and the collected particulates is conventionally designated as the dirty gas or dirty air plenum and, in the illustrated unit, is disposed below the tube sheet as generally designated by the reference numeral 32. The tube sheet 22 thus functions in addition to supporting the permeable media, as the separating wall between the dirty and clean air plenums and limits gas flow therebetween to passage through the permeable filter media 24. As shown in FIG. 1, the entire filtering assembly 16 is adapted to be displaced into and out of the perimetric housing 10, through a suitable wall door or the like, on the runners 34 and to be disposed exterior of the housing 10 on platform 36 to facilitate inspection and replacement of the filtering media or other frame containing components.

As will now be apparent, the desired limitation of flow of the gaseous carrier through the permeable filter media requires that the tube sheet 22 be disposed in gas tight relation with the perimetric housing during filtering operations and yet be readily separable therefrom and displaceable relative thereto to facilitate its removal from and reinsertion into the housing.

Figure 2:
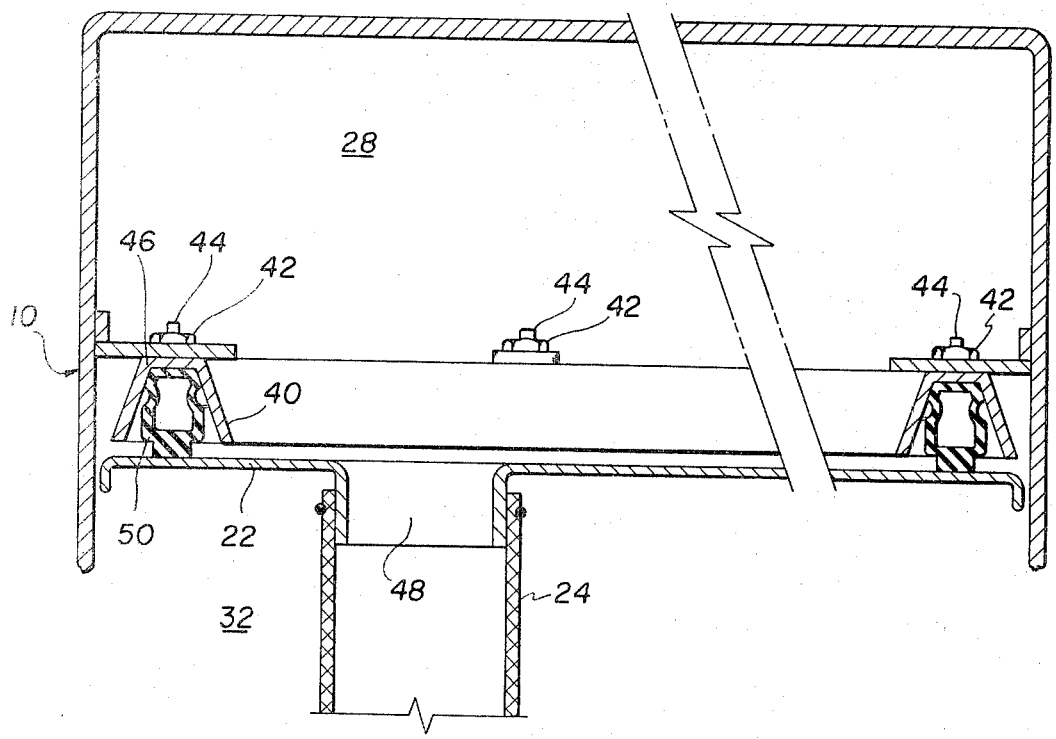
FIG. 2 is a greatly enlarged and fragmentary sectional view of a portion of the filtering apparatus illustrated in FIG. 1 and particularly delineates the positioning of the tube sheet in operative filtering relation within the housing and with the sealing means of this invention in fully inflated condition.

Referring now to FIGS. 2 and 4, there is provided a generally U-shaped channel member 40 disposed in inwardly spaced relation from and peripherally extending around the interior wall of the perimetric housing 10 at a predetermined elevation within the clean air plenum portion thereof. Such channel 40 is conveniently mounted in its desired position by bolt members 44 interconnecting the base portion 46 thereof to the underside of a plurality of inwardly extending lugs or shelf members 42. As best shown in FIG. 2 the dependent edges of the channel 40 are disposed in adjacent but spaced relation with the upper surface of the tube sheet 22 having the permeable filter tubes 24 dependently mounted, in any suitable manner, from downwardly flanged apertures 48 therein and, as such permits, in the practice of this invention, the tube sheet 22 and associated filter socks 24 to be readily displaced into and out of the housing solely by horizontal displacement thereof.

Disposed within the channel member 40 is an elongate, generally doughnut shaped but selectively sized and contoured annular inflatable sealing member, generally designated 50 and formed of elastically deformable material. As best shown in FIG. 4, a preferred construction therefor and which is of the same general type employed to seal canopies in aircraft and the like, includes a planar top portion 52 adapted to be adhesively bonded to the base portions 46 of the channel member 40, a generally planar base portion 54 having a sealing pad portion 56 externally dependent therefrom and a pair of easily deformable side wall portions 58.

As illustratively depicted in FIG. 4, inflation and deflation of the sealing member is conveniently effected through a conventional Schrader type fitting 60. Although such inflation can be effected by any suitable means, a system particularly well adapted to effect both positive inflation and deflation in collectors employing pulse jet cleaning techniques, as taught and disclosed in U.S. Reissue Pat. No. 24,954, is depicted in FIG. 3. As is well known to those skilled in this art such pulse jet cleaning techniques include the release of a momentary burst of high pressure air through a selectively positioned nozzle 62 in the form of a jet countercurrent to normal filtering flow through a venturi 64 or other restricted opening adjacent the downstream end of the filter socks 24. Such high pressure air is obtained from an auxiliary supply of compressed air and in the herein preferred construction such compressed air can be utilized to effect both inflation and deflation of the sealing member 50. To the above end and as shown in FIG. 3, such supply of compressed air 66, as for example at 90 psi, is connected through a suitable valve 68 and pressure regulator assembly 70, via lines 71 and 73, to the sealing member 50 to permit inflation thereof at a desired pressure, for example at about 30 psi. When so inflated, as per selective manipulation of valve 68, the base portions 46 thereof will be forced downwardly, and, as guided by the confining side walls of the channel member 40, the sealing pad portion 56 thereof will be extended therebeyond so as to be disposed and maintained in a pressure biased sealed engagement with the adjacent and upwardly facing surface of the tube sheet 22. Under the conditions, a gas tight seal will be established intermediate the perimetric housing and the periphery of the tube sheet 22 to effectively separate the clean and dirty air plenum (28 and 32) to limit fluid flow therebetween to gas passing through the permeable media 24 and sufficient force will be created to effectively immobilize the tube sheet 22 (and the filtering assembly 16 in a FIG. 1 unit) against undesired displacement thereof. Such seal will of course be maintained as long as the sealing member 50 is in an inflated condition.

In order to effect rapid deflation of the sealing member 50 and to assure positive withdrawal of the base portion 46 thereof within the side walls of the channel member 40 (as shown in dotted lines in FIG. 4) to eliminate possible damage thereof during displacement of the tube sheet assembly, the compressed air source is utilized to effect positive deflation thereof to below ambient pressure. To the above ends, such compressed air source 66 is also connected through a valve 72 to the nozzle 74 of an ejector pump assembly 76. The ejector pump 76, when operative, is adapted to induce a flow of gas from the sealing member 50 through the lines 73 and 75 and normally closed but now open valve 78 outwardly of the system.

As will now be apparent rapid and positive inflation and deflation of the sealing member can be pneumatically effected in a simple manner by selective manipulation of valve members 68, 72 and 78 all to the end of facilitating removal and reinsertion of the tube sheets and associated filtering media assemblages in dust collectors and without the necessity of employing movable mechanical elements within the dirty air plenum chamber.

Having thus described our invention, we claim:

1. Dust collection apparatus for effecting separation of particulate matter from a gaseous carrier thereof, comprising
    a perimetric housing,
    a tube sheet removably mounted therein operatively subdividing the interior of said housing into a clean air plenum and a dirty air plenum,
    a plurality of elongate filter socks of permeable filter media disposed within said dirty air plenum for limiting the flow of gaseous carrier from said dirty plenum to said clean air plenum to passage therethrough, said filter socks being suspendedly mounted on said tube sheet and displaceable in conjunction therewith externally of said perimetric housing, an inflatable hollow sealing means mounted on said perimetric housing and in spaced inflatably engageable relation with the periphery of said filter media supporting tube sheet when the latter is operatively mounted within said perimetric housing so as to permit unimpeded displacement of said tube sheet and filter media supported thereby externally of said housing when said sealing means is in uninflated condition, a source of compressed air, means for effecting removal of collected particulate matter from the surface of said filter media, means for selectively introducing compressed air from said source into said sealing means to displace a portion thereof into continuous gas tight sealing relationship with the surface of said tube sheet when the latter and the filter media supported thereby are mounted within housing and to thereby limit the flow of gaseous carrier from the dirty air plenum to the clean air plenum to passage through said filter media, ejector pump means responsive to a selective flow of released compressed air from said source therethrough to induce a flow of confined gaseous fluid from said sealing means and thereby positively reduce the pressure therein to a valve below that of ambient pressure and induce a collapse of said sealing means and a retraction thereof from engaged relation with said tube sheet, and valve means for selectively effecting the introduction of said compressed air into said sealing means to inflate the same and the introduction of said compressed air into said ejector pump means for effecting positive deflation of said sealing means.

2. A dust collector as set forth in claim 1 wherein said means for effecting removal of collected particulate matter employs said compressed air.

3. A dust collector as set forth in claim 2 wherein said inflatable hollow sealing means is disposed within a U-shaped channel member perimetrically mounted on the interior of said housing and within said clean air plenum portion thereof having its open dependent end disposed in spaced relation with the periphery of said tube sheet when the latter is disposed in operative relation within the housing with the filter media supported thereby disposed within the dirty air plenum.

* * * * *

UNITED STATES PATENT OFFICE
CERTIFICATE OF CORRECTION

Patent No. 3,849,092  Dated November 19, 1974

Inventor(s) Even Bakke et al.

It is certified that error appears in the above-identified patent and that said Letters Patent are hereby corrected as shown below:

Column 1, line 40, "removably" should read -- removable --.

Column 4, line 68, after "dirty" insert -- air --.

Signed and Sealed this first Day of June 1976

[SEAL]

Attest:

RUTH C. MASON
Attesting Officer

C. MARSHALL DANN
Commissioner of Patents and Trademarks